(12) United States Patent
Rao et al.

(10) Patent No.: US 6,738,074 B2
(45) Date of Patent: May 18, 2004

(54) IMAGE COMPRESSION SYSTEM AND METHOD

(75) Inventors: Kashipati G. Rao, Dallas, TX (US); Nengtan Lin, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 550 days.

(21) Appl. No.: 09/732,858

(22) Filed: Dec. 8, 2000

(65) Prior Publication Data

US 2002/0071611 A1 Jun. 13, 2002

(Under 37 CFR 1.47)

Related U.S. Application Data

(60) Provisional application No. 60/173,521, filed on Dec. 29, 1999.

(51) Int. Cl.[7] .............................................. G06T 15/00
(52) U.S. Cl. .................................................... 345/643
(58) Field of Search ................................ 382/250, 251; 345/619, 643, 644, 645

(56) References Cited

U.S. PATENT DOCUMENTS 5,923,787 A * 7/1999 Hara et al. ................... 382/251
6,249,614 B1 * 6/2001 Kolesnik et al. ............ 382/251

* cited by examiner

*Primary Examiner*—Phu K. Nguyen
(74) *Attorney, Agent, or Firm*—W. James Brady, III; Frederick J. Telecky, Jr.

(57) ABSTRACT

A method for generating image compression quantization matrices is disclosed. A method includes a step of locating a frequency coefficient (120) within a transform array (107). A method also includes a step determining a frequency content (122) for the frequency coefficient (120). Method also includes the step of determining the orientation content for the frequency coefficient (120). The method also includes the step of selecting a quantization matrix (110) correlating to the frequency content (122) and the orientation content. The method also includes the step of quantizing the transform array (107) with the quantization matrix (110).

14 Claims, 2 Drawing Sheets

IMAGE COMPRESSION SYSTEM AND METHOD

This application claims priority under 35 USC §119(e)(1) of provisional application No. 60/173,521, filed Dec. 29, 1999.

TECHNICAL FIELD OF THE INVENTION

The present invention relates to image compression systems, and, more particularly, to methods and systems for determining a quantization matrices for image compression operations.

BACKGROUND OF THE INVENTION

The field of data compression seeks to develop improved compression methods. One of the dilemmas of the art of data compression is selecting appropriate compression techniques. In general, a compressor, or encoder, compresses raw data to an output stream. A decompressor, or decoder, converts in the opposite direction to restore the image. Certain known compression methods are lossy. These methods, used for image compression, achieve better compression by losing some information from the input stream. When the compressed stream is decompressed, the result is not identical to the original image. If the loss of data is small, the perceptual difference in the decompressed image is not recognizable.

Images are important in many computer, internet and communication applications. The image data size, however, tends to be large. The image exists for human perception. Thus, when the image is compressed, it is not uncommon to lose image features for which the human eye is not sensitive without noticeable image degradation.

Human visual perception is sensitive to some frequencies but not to others. Thus, known image compression methods seek to remove those frequencies that are less sensitive to human visual perception. The discrete cosine transform ("DCT") is a widely used transform in image compression to identify frequencies. DCT is the preferred transform technique for lossy image compression. For example, a 2-dimensional DCT maybe applied to an 8×8 block of pixels in an image. Coefficients produced by the DCT are quantized to provide the actual compression coefficients. Most DCT coefficients are small and become zero after quantization.

Human visual perception is less sensitive to the high frequency components of an image represented by the higher DCT coefficients. After each 8×8 block of DCT coefficients is calculated, it is quantized. This is the step wherein information loss occurs. Each number in the DCT coefficients' matrix is divided by the corresponding number from a particular quantization matrix. The results are rounded to the nearest integer. A large quantization factor usually is applied to higher frequency components within the DCT coefficients' matrix. Thus, a quantization matrix has higher quantization factors for higher frequency DCT coefficients.

A trade-off exists between image quality and the degree of quantization. A large quantization step size may produce unacceptably large image distortion. Finer quantization, however, leads to reduced compression ratios. Thus, known image compression methods seek to quantize DCT coefficients in an efficient manner to provide a compressed image with little image distortion perceptive to the human eye. Because of the human eyesight's natural high frequency roll-off, high frequencies play a less important role in known image compression methods than low frequencies.

A quantization matrix is an 8×8 matrix of step sizes, sometimes called quantums. The quantization matrix has one element for each DCT coefficient. A quantization matrix usually is symmetric. Step sizes may be small in the upper left corner of the matrix and correlate to low frequencies. Step sizes may be large in the upper right corner of the matrix and represent high frequencies. A step size of 1 is the most precise. A quantizer divides the DCT coefficient by its corresponding quantum, then rounds to the nearest integer. Large quantums drive small coefficients down to zero. Thus, many high frequency coefficients become zero and, therefore, an image is easier to encode. The low frequency coefficients undergo only minor adjustments. Zeros among the high frequency coefficients result in an efficient compression. Thus, known image compression methods use a higher quantum for the high frequency coefficients with little noticeable image deterioration.

Quantization matrices, or tables, may be generated by default or computed. Further, it may be desirable to quantize the DCT coefficients by some metric that optimizes image compression by losing coefficients not sensitive to the human visual system. Known methods compare previous image coefficients with an instant image coefficient to locate similar blocks and to find a best match. Differences between the previous image and the instant image are determined.

Human visual systems, however, are not sensitive always to particular frequencies or spatial differences within an image. In other words, a human visual system may be less sensitive to a particular DCT coefficient in one instance and more sensitive in another context. Thus, different quantization matrices may be desired to compress a plurality of images. Known methods may search a group of stored quantization matrices to locate a matrix for optimal compression. These methods of image compression are time-consuming and inefficient for determining and optimizing quantization matrices.

SUMMARY OF THE INVENTION

From the foregoing, it may be appreciated that a need had arisen for an image compression system having optimized vision encoding. In accordance with an embodiment of the present invention, an image compression system and method are provided that substantially eliminates and reduces the disadvantages and problems associated with conventional image compression systems.

In accordance with one embodiment of the present invention, a method for selecting a quantization matrix to quantize a transform array is provided. The method includes the step of locating a frequency coefficient within the transform array. The method also includes determining an orientation content for the frequency coefficient. The method also includes the step of selecting a quantization matrix correlating to the frequency content and the orientation content. The method also includes partitioning the quantization coefficient matrix with the model matrix to generate a quantization matrix.

In accordance with another embodiment of the present invention, a method for quantizing a transform array of an image is provided. The method includes the step of locating a frequency coefficient within the transform array. The method also includes the step of determining a frequency content for the frequency coefficient. The method also includes the step of determining an orientation content for the frequency coefficient. The method also includes the step of selecting a quantization matrix correlating to the frequency content and the orientation content and the step of quantizing the transform array with the quantization matrix.

In accordance with another embodiment of the present invention, an image compression is provided. The system includes an image having a transform array. The system also includes a frequency coefficient within the transform array. The frequency coefficient has a frequency content and an orientation content. The system also includes a quantization matrix correlating to the frequency content and the orientation content. The system also includes a quantizer that quantizes the transform array with the quantization matrix to generate a quantized array.

Thus, the present invention obtains phased-reliable discrete cosign transformed-basis functions and uses them to partition a quantization matrix using channel image distortion matrix. The co-efficient in the quantization co-efficient matrix correlate to frequency bands in orientations in the channel image distortion matrix. The partition is then used for vision optimized encoding.

The channel image distortion model matrix produces image distortion matrix values for vertical and horizontal orientations. For each orientation, image distortion matrix values are generated for three frequency bands: low, mid, and high frequency bands.

A technical advantage of the present invention is that the function of transforming an image for encoding is treated as a continuous function. Another technical advantage of the present invention is that the quantization matrices may be classified to reduce search time. Another technical advantage of the present invention is that a plurality of quantization matrices may be stored and updated in a memory.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE DRAWING

Figure 1A:
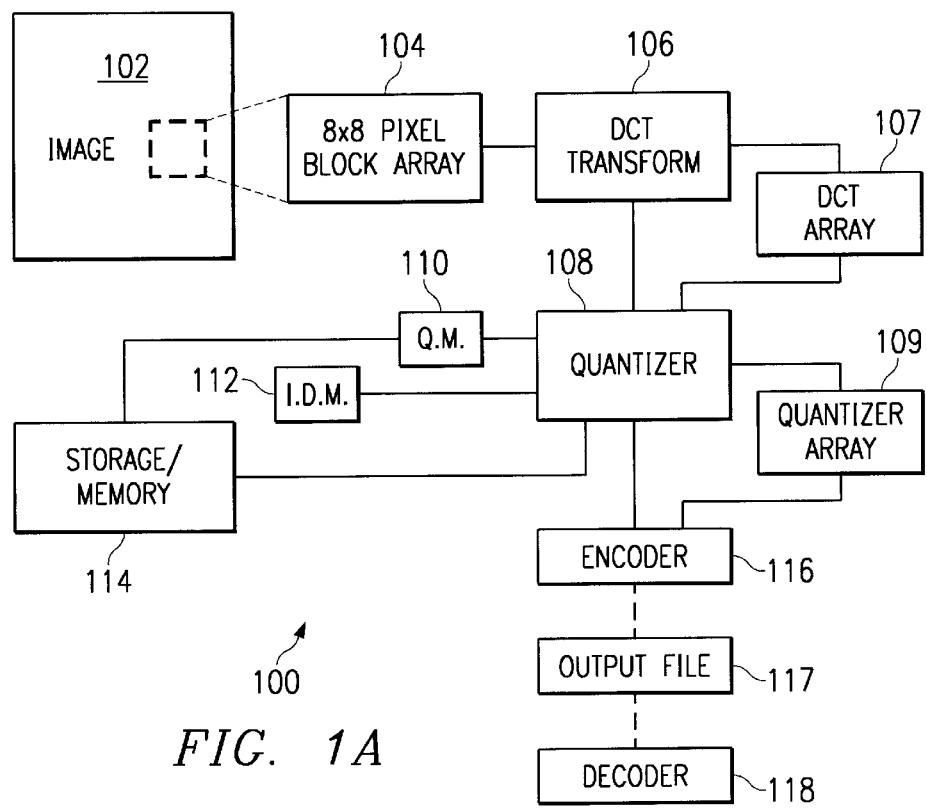
FIG. 1A illustrates an image compression system in accordance with an embodiment of the present invention.
Figure 1B:
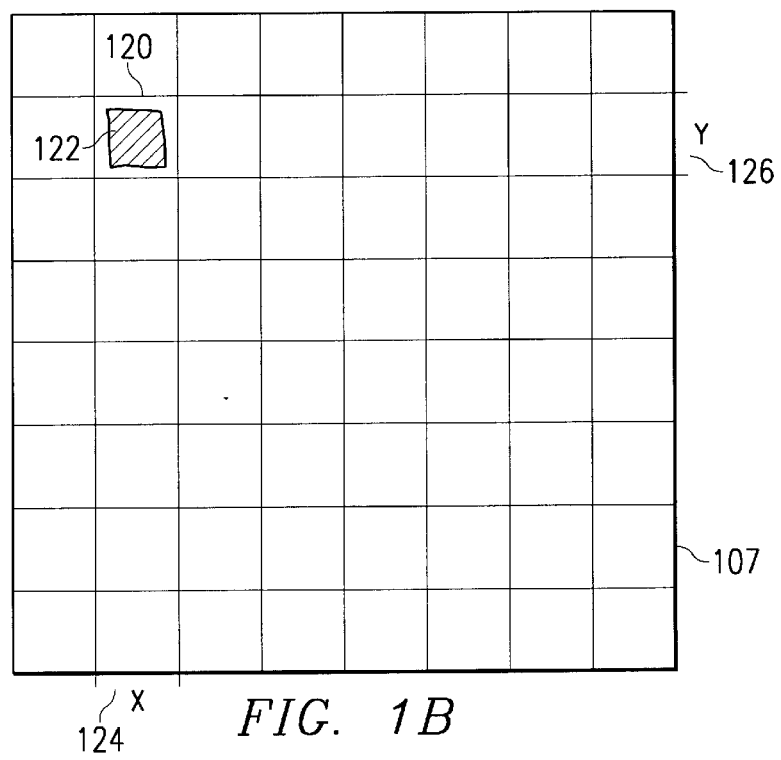
FIG. 1B illustrates a transform array in accordance with an embodiment of the present invention.
Figure 2:
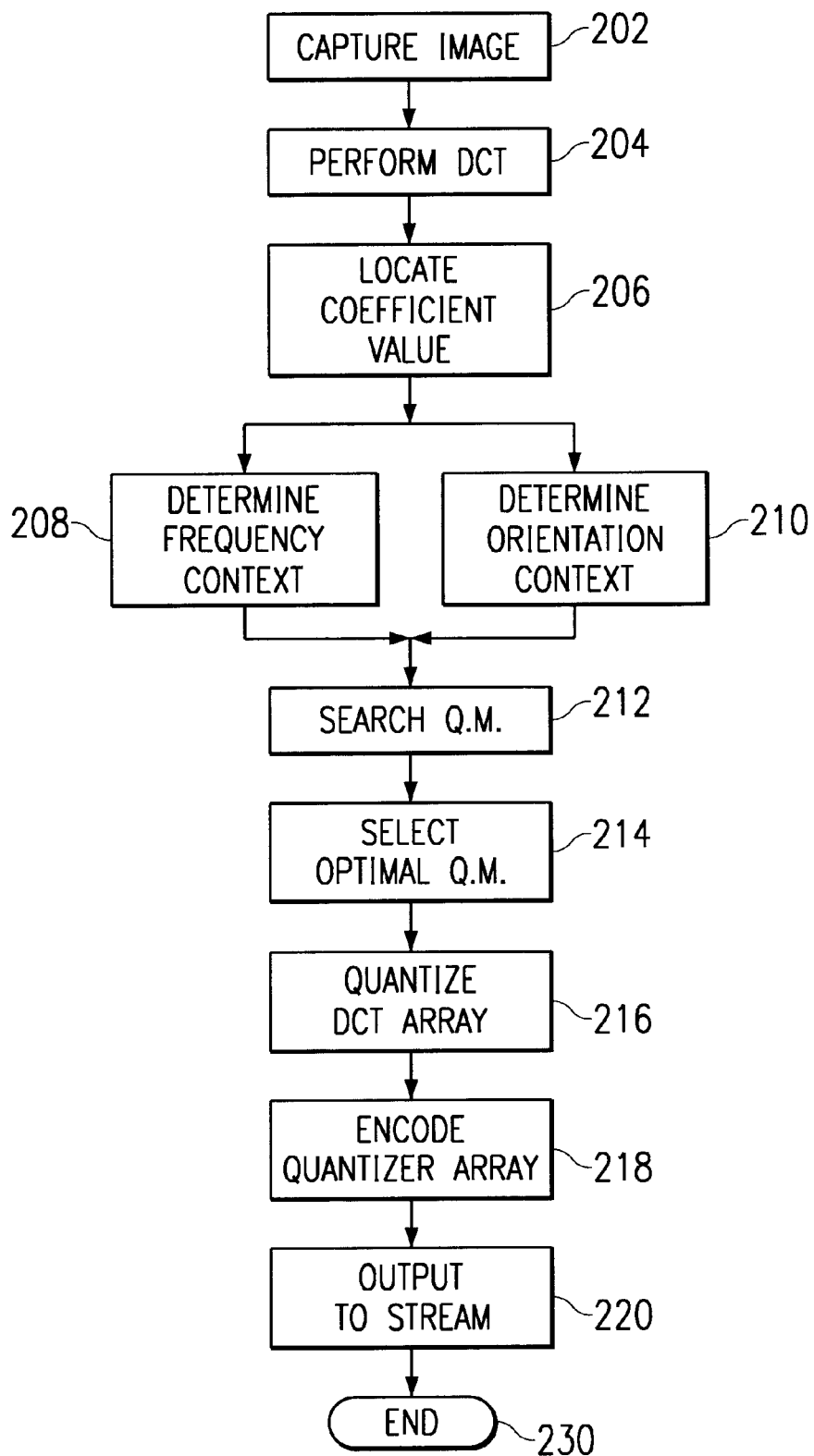
FIG. 2 illustrates a flowchart depicting a method for determining quantization matrices for optimized vision encoding in accordance with an embodiment of the present invention.

An embodiment of the present invention and its advantages are best understood by referring now in more detail to FIGS. 1–2 of the drawings, in which like numerals refer to like parts. FIGS. 1–2 illustrate an image compression system and method for optimized vision encoding in accordance with an embodiment of the present invention.

FIG. 1A depicts an image compression system 100. Within image compression system 100, an image 102 is retrieved or captured. Image 102 is a graphical image in 2-dimensions. Image 102 includes a horizontal orientation and a vertical orientation. Image 102 may be a picture, graphic, or the like. Preferably, image 102 is a natural image or scene. Image 102 is comprised of pixels. Pixels of image 102 may vary by color, contrast, luminance, intensity and gray scale level. Pixel block 104 is a block of pixels within image 102. In a preferred embodiment, pixel block 104 has an 8×8 dimension. Image 102 comprises a plurality of pixel blocks 104 that are captured by image compression system 100.

Transformer 106 calculates the DCT of each pixel block within pixel block array 104. As described above, the DCT coefficients calculated by transformer 106 represent the transform of a signal or image from the spatial domain to the frequency domain. DCT operations help separate pixel block array 104 into parts, or spectral sub-bands, of differing importance with respect to the visual quality of the pixel blocks within pixel block array 104. Thus, transformer 106 generates a DCT transform array 107 correlating to the pixel blocks within pixel block array 104.

DCT transform array 107 has high and low frequency values. As described above, high frequency DCT values may not be perceived by the human visual system. DCT transform array 107 has low frequency values in the upper left hand corner of the array. High frequency DCT values are in the lower right hand corner of the array.

Quantizer 108 receives DCT transform array 107 and selects a quantization matrix 110 for optimized vision encoding. Quantizer 108 selects quantization matrix 110 according to the appropriate frequency coefficient within DCT transform array 107. Referring to FIG. 1B, DCT transform array 107 is depicted. Transform array 107 is an 8×8 matrix of a plurality of frequency coefficient blocks. The blocks represent a DCT transform coefficient value for each pixel block within pixel block array 104. Quantizer 108 selects a DCT coefficient according to a selection process, or algorithm. Preferably, quantizer 108 selects the maximum absolute DCT coefficient value within transform array 107. For example, quantizer 108 selects block 120 of transform array 107 as the frequency coefficient. Using the selection algorithm, quantizer 108 identifies block 120 as the frequency coefficient that best characterizes transform array 107.

Coefficient block 120 includes a frequency content 122 and an orientation content comprising horizontal orientation 124 and vertical orientation 126. Frequency content 122 is the frequency value of coefficient block 120. The orientation content represents the location of coefficient block 120 within transform array 107. Horizontal orientation 124, or X, represents the location of coefficient block 120 in the horizontal direction of transform array 107. Vertical orientation 126, or Y, represents the location of coefficient block 120 in the vertical direction of transform array 107. Thus, coefficient block 120 is identified by its frequency content and location within transform array 107.

Quantization matrices 110 are stored within memory 114. Quantization matrices 110 may be generated by any known techniques. Further, quantization matrices 110 may be generated previously by quantizer 108. Quantization matrices 110 are classified according to frequency and orientation content. Quantization matrices 110 include quantization parameters to quantize transform array 107. A quantization matrices 110 having frequency and orientation contents similar to frequency content 122 and the orientation content denoted by horizontal orientation 124 and vertical orientation 126 is selected to quantize transform array 107. Thus, the present invention includes a database of quantization matrices and, during compression operations, selects the appropriate quantization matrix with quantization parameters for encoding a transform array.

The number of quantization matrices 110 may vary according to the requirements of image compression system 100. An increased number of images 102 may necessitate an increased number of quantization matrices 110. Preferably, quantization matrices 110 are stored with the memory 114 using a classification approach. Each class has one quantization coefficient value with all frames having the same coefficient value belonging to the same class. These similar quantization coefficient values may have differing histograms or orientation content. Quantizer 108 may compare the coefficient class using the orientation content for the coefficient block 120. Further, quantization matrices 110 may be classified according to a range of frequency values.

For each new image 102, quantizer 108 locates an optimum coefficient, such as coefficient block 120, and determines its frequency content and orientation content. Using these parameters, quantizer 108 selects a quantization matrix 110 that best corresponds to frequency content 124 and orientation content of coefficient block 120. Quantization matrices 110 having the particular frequency and orientation content represent similar images 102, comparable to the image being compressed. Thus, image compression system 100 does not perform multiple comparison with previous images or quantization matrices in order to compress an image. Compression operations may be performed in a continuous manner and in a real-time environment. Further, quantizer 108 may store quantization matrices 110 as they are generated according to their identified coefficient parameters.

Quantizer 108 receives DCT transform array 107, as well as quantization matrix 110, and an image distortion metric model 112. Image distortion metric ("IDM") model 112 is a model of a human visual system generated in a known manner. IDM 112 is comprised of values that correlate to spatial frequency combinations sensitive to the human visual system. IDM 112 comprises a matrix with values for vertical and horizontal orientations. For each orientation, IDM 112 has values for three frequency bands. The three frequency bands are low, mid, and high. IDM 112 provides output in just-noticeable-difference ("JND"). JND provides a reliable indication of the perceived image quality and corresponds to perfect image quality at the lowest possible bit rate. IDM 112 may be generated by performing tests on human visual systems regarding perception of colors, gray-scales or the like. Using these tests, IDM 112 is generated.

Quantization matrix 110 is stored in memory 114. Thus, when quantizer 108 receives transform array 107 from transformer 106, quantizer 108 selects quantization matrix 110 as described above. Quantizer 108 also retrieves IDM 112. IDM 112 also may be stored in memory 114. Alternatively, IDM 112 may be supplied by the user via a disk, algorithm, or other the like.

Quantizer 108 may partition quantization matrix 110 with IDM 112. By partitioning with IDM 112, quantization matrix 110 has increased sensitivity to the human visual system. Thus, quantization matrix 110 may be refined to provide a more optimal quantization matrix 110 in order to quantize transform array 107. Alternatively, quantizer 108 may not input IDM 112 and not partition quantization matrix 110.

Transform array 107 is quantized by quantization matrix 110. Information loss occurs during this process. Each number in transform array 107 is divided by the corresponding number from quantization matrix 110. The result is rounded to the nearest integer. Quantizer 108 produces a quantized array 109 comprised of the integers formulated during quantization. Typically, quantized array 109 has a few non-zero numbers in the upper left corner of the array, or matrix.

Quantized array 109 is input to encoder 116 to be further compressed before being written onto the output stream. Quantized array 109 has a DC coefficient that is a measure of the average value of the 64 original pixels comprising the data array. The DC coefficient is located at the top left corner of quantized array 109. A continuous tone image does not have noticeable variation within array 109 from the DC coefficient. Encoder 116 outputs the DC coefficient first, then follows with the differences in consecutive data units. Thus, image 102 is compressed after transformation and quantization by encoder 116. Encoder 116 uses a variable length code on the coefficients within quantized array 109 and a compressed data stream to create output file 117. For decompression, decoder 118 recovers the quantized DCT coefficients from the compressed data output stream within output file 117, takes the inverse transform and displays image 102. The operations to decode the compressed image are performed in the opposite order of the encoding operations.

FIG. 2 depicts a flowchart of a method for determining quantization matrices for optimal vision encoding in accordance with an embodiment of the present invention. Step 202 executes by capturing image 102. Step 202 may capture image 102 from a video recording device, a still image, a downloaded image from the internet, a still image from a digital camera or the like. Step 204 executes by performing discrete cosine transform operations on block array 104 within image 102. Transform array 107, is generated having DCT coefficients that represents the spatial-frequency transforms from block array 104. Step 206 executes by locating an optimum coefficient within transform array 107 such as coefficient block 120. Preferably, the optimum coefficient is the maximum absolute frequency value within transform array 107.

Step 208 executes by determining frequency content 124 for coefficient block 120 located in step 206. Frequency content 124 is the frequency value of the selected coefficient. Step 210 executes by determining an orientation content for coefficient block 120 selected in step 206. The orientation content includes horizontal orientation 124 and vertical orientation 126 of coefficient block 120 within transform array 107. The orientation content may be used as a histogram to search for a quantization matrix. Step 212 executes by searching stored quantization matrices 110 for an optimal quantization matrix for transform array 107. Step 214 executes by selecting an optimal quantization matrix 110 according to frequency content 124 and the orientation content for coefficient block 120. Quantizer 108 in step 214 identifies an appropriate class of matrices to search according to frequency content 124. After identifying the appropriate classification of matrices, quantizer 108 searches the class according to the orientation content, or the histogram, generated in step 210. The selected quantization matrix 110 may be an exact match to frequency content 124 and the orientation content determined for coefficient block 120. Alternatively, quantization matrix 110 may be within a range of acceptable frequencies or orientations within the class identified by quantizer 108.

Step 216 executes by quantizing transform array 107 with selected, optimal quantization matrix 110. IDM 112 may be used to partition quantization matrix 110 prior to quantization operations. By using IDM 112, quantization matrix 110 may be further refined with increased sensitivity to a human-visual system model. Step 216 also executes by generating a quantized array 109. Step 218 executes by encoding quantized array 109 with encoder 116. Step 220 executes by encoder 116 outputting output file 117 that includes the DC coefficient of quantized array 109 followed by the AC coefficients. Output file 117 is outputted to decoder 118 for decompression operations. Step 230 executes by completing image compression operations.

Thus, it is apparent that there has been provided, in accordance with an embodiment of the present invention, an image compression system and method for optimized vision encoding that satisfies the advantages set forth above. Although the present invention has been described in detail, it should be understood that various changes, substitutions and alterations may be made herein. Other examples are readily ascertainable by one skilled in the art and may be made without departing from the spirit and the scope of the present invention as defined by the following claims.

What is claimed is:

1. A method for quantizing a transform array of an image, the method comprising the steps of:

locating a frequency coefficient within said transform array that best characterizes said transform array;

determining a frequency content for said frequency coefficient;

determining an orientation content for said frequency coefficient;

selecting a quantization matrix correlating to said frequency content and said orientation content; and quantizing said transform array with said quantization matrix.

2. The method of claim 1, wherein said orientation content determining step further includes the steps of, determining a horizontal orientation of said frequency coefficient; and determining a vertical orientation of said frequency coefficient.

3. The method of claim 1, wherein said selecting step includes retrieving said quantization matrix from a memory.

4. The method of claim 1, wherein said locating includes determining a maximum absolute value within said transform array, said frequency coefficient corresponding to said maximum absolute value.

5. The method of claim 1, wherein said quantizing step includes generating a quantized array.

6. The method of claim 5, further comprising the step of:

encoding said quantized array to generate an output file.

7. The method of claim 6, further comprising the step of:

transmitting said output file.

8. The method of claim 7, further comprising the step of:

decoding said output file and displaying said image.

9. The method of claim 1, wherein said selecting step includes partitioning the quantization matrix with an image distortion metric that has increased sensitivity to the human visual system.

10. An image compression system, comprising:

an image having a transform array;

a frequency coefficient within said transform array that best characterizes said transform array; said frequency coefficient having a frequency content and an orientation content;

a quantization matrix correlating to said frequency content and said orientation content; and a quantizer that quantizes said transform array with said quantization matriz to generate a quantized array; said quantizer further includes an image distortion metric that has increased sensitivity to the human visual system that partitions said quantization matrix.

11. The system of claim 10, wherein said image has a pixel block, said transform array corresponding to said pixel block array.

12. The system of claim 11, wherein said transform is the discrete cosine transform of said pixel block array.

13. The system of claim 10, further comprising:

an encoder for encoding said quantized array.

14. The system of claim 10, wherein said quantizer further includes an image distortion metric that partitions said quantization matrix.

* * * * *